US010756623B1

(12) United States Patent
Petersen

(10) Patent No.: US 10,756,623 B1
(45) Date of Patent: Aug. 25, 2020

(54) LOW LOSS POWER CONVERTER

(71) Applicant: Dialog Semiconductor (UK) Limited, London (GB)

(72) Inventor: Holger Petersen, Pastetten (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/386,770

(22) Filed: Apr. 17, 2019

(51) Int. Cl.
*H02M 3/07* (2006.01)
*H02M 1/088* (2006.01)

(52) U.S. Cl.
CPC .............. *H02M 3/07* (2013.01); *H02M 1/088* (2013.01)

(58) Field of Classification Search
None
See application file for complete search history.

(56) References Cited

U.S. PATENT DOCUMENTS

| | | | |
|---|---|---|---|
| 7,230,405 B2 | 6/2007 | Jang et al. | |
| 9,768,682 B2 | 9/2017 | Banag | |
| 10,218,255 B1 | 2/2019 | Petersen | |
| 10,256,729 B1 | 4/2019 | Notsch | |
| 10,291,117 B2 | 5/2019 | Petersen | |
| 2008/0079393 A1* | 4/2008 | Spartano ................... | H02J 1/00 320/110 |
| 2008/0157732 A1 | 7/2008 | Williams | |
| 2008/0158915 A1 | 7/2008 | Williams | |
| 2009/0033289 A1 | 2/2009 | Xing et al. | |
| 2009/0174466 A1* | 7/2009 | Hsieh ....................... | H02M 3/07 327/536 |
| 2010/0188065 A1* | 7/2010 | Shiwaya .................. | H02M 3/07 323/299 |
| 2011/0062940 A1* | 3/2011 | Shvartsman ............ | H02M 3/07 323/351 |
| 2013/0147543 A1* | 6/2013 | Dai .......................... | H02M 3/07 327/536 |
| 2014/0070787 A1* | 3/2014 | Arno ....................... | H02M 3/07 323/304 |

(Continued)

OTHER PUBLICATIONS

"Multi-Level Conversion: High Voltage Choppers and Voltage-Source Inverters," by T.A. Meynard et al, PESC '92 Record, 23rd Annual IEEE Power Electronics Specialists Conference, Jun. 29-Jul. 3, 1992, pp. 397-403.

(Continued)

*Primary Examiner* — Jeffrey A Gblende
(74) *Attorney, Agent, or Firm* — Saile Ackerman LLC; Stephen B. Ackerman

(57) ABSTRACT

A power converter and method are presented. The converter provides a ground terminal, an input terminal and an output terminal. The power converter includes first, second and third flying capacitor coupled to a network of switches and a driver. The network of switches has a first switch coupled to the input terminal; a second switch to couple the first flying capacitor to the third flying capacitor; and a third switch to couple the second flying capacitor to the third flying capacitor; The driver is adapted to drive the network of switches with a sequence of states during a drive period. The sequence of states includes a first state and a second state. In the first state the ground terminal is coupled to the output terminal via a first path with the first flying capacitor and the third flying capacitor, and via a second path with the second flying capacitor.

22 Claims, 12 Drawing Sheets

(56) References Cited

U.S. PATENT DOCUMENTS

| | | |
|---|---|---|
| 2015/0061613 A1 | 3/2015 | Kondou |
| 2015/0280553 A1 | 10/2015 | Giuliano et al. |
| 2015/0311793 A1 | 10/2015 | Khayat et al. |
| 2016/0344214 A1 | 11/2016 | Petersen et al. |
| 2017/0244318 A1 | 8/2017 | Giuliano |
| 2017/0302093 A1 | 10/2017 | Petersen |
| 2018/0175726 A1 | 6/2018 | Petersen et al. |

OTHER PUBLICATIONS

"Three-Level Buck Converter for Envelope Tracking Applications," by Vahid Yousefzadeh et al., IEEE Transactions on Power Electronics, vol. 21, No. 2, Mar. 2006, pp. 549-552.

"A Fully-Integrated 3-Level DC-DC Converter for Nanosecond-Scale DVFS," by Wonyoung Kim et al., IEEE Journal of Solid-State Circuits, vol. 47, No. 1, Jan. 2012, pp. 206-219.

"Zero Inductor Voltage Multilevel Bus Converter," by Samuel Webb et al. 2018 IEEE Applied Power Electronics Conference and Exposition (APEC), Mar. 4-8, 2018, pp. 2175-2182.

"A Hybrid Inductor-Based Flying-Capacitor-Assisted Step-Up/Step-Down DC-DC Converter with 96.56% Efficiency," by Yong-Min Ju et al., 10.4, 2017 IEEE International Solid-State Circuits Conference, Feb. 5-9, 2017, pp. 184-186.

"A Hybrid Dual-Path Step-Down Converter with 96.2% Peak Efficiency Using a 250mΩ Large-DCR Inductor," by Yeunhee Huh et al., 2018 Symposium on VLSI Circuits, Jun. 18-22, 2018, pp. 225-226.

"A Hybrid Structure Dual-Path Step-Down Converter with 96.2% Peak Efficiency Using a 250-mΩ Large-DCR Inductor," by Yuenhee Huh et al., IEEE Journal of Solid-State Circuits, vol. 54, No. 4, Apr. 219, pp. 959-967.

"Split-Phase Control: Achieving Complete Soft-Charging Operation of a Dickson Switched-Capacitor Converter," by Yutian Lei et al., IEEE Transactions on Power Electronics, vol. 31, No. 1, Jan. 2016, pp. 770-782.

"Fully Inegrated Buck Converter with 78% Efficiency at 365 mW Output Power Enabled by Switched-Inductor-Capacitor Topology and Inductor Current Reduction Technique," by Nghia Tang et al., 2019 IEEE International Solid-State Circuits Conference—(ISSCC), Feb. 2019, pp. 152-154.

USPTO Office Action, U.S. Appl. No. 16/386,761, Applicant: Petersen, Holger, dated Oct. 1, 2019, 18 pages.

Co-pending U.S. Appl. No. 16/386,735, filed Apr. 17, 2019 "A Power Converter," by Holger Petersen, 26 pgs.

Co-pending U.S. Appl. No. 16/386,761, filed Apr. 17, 2019, "A Multi-Level Power Converter," by Holger Petersen, 30 pgs.

PTO Office Action, U.S. Appl. No. 16/386,761, Applicant: Petersen, Holger, dated Feb. 10, 2020, 14 pgs.

PTO Office Action, U.S. Appl. No. 16/386,735, Applicant: Petersen, Holger, dated Feb. 10, 2020, 21 pgs.

\* cited by examiner

*Intermediate Magnetization State I1*

*Intermediate Magnetization State I2*

┌─ 1310
Providing a ground terminal, an input terminal for receiving an input voltage and an output terminal for providing an output voltage;

┌─ 1320
Providing a first, a second and a third flying capacitor coupled to a network of switches; the network of switches comprising a first switch coupled to the input terminal; a second switch to couple the first flying capacitor to the third flying capacitor; a third switch to couple the second flying capacitor to the third flying capacitor; a first ground switch to couple the first flying capacitor to ground; a second ground switch to couple the second flying capacitor to ground, and a third ground switch to couple the third flying capacitor to ground; and ┌─ 1330
Driving the network of switches with a sequence of states during a drive period, the sequence of states comprising a first state and a second state; wherein in the first state the ground terminal is coupled to the output terminal via a first path comprising the first flying capacitor and the third flying capacitor, and via a second path comprising the second flying capacitor.

*FIG. 13*

LOW LOSS POWER CONVERTER

RELATED PATENT APPLICATIONS

This application is related to application Ser. No. 16/386,761, filed on Apr. 17, 2019, and to application Ser. No. 16/386,735, filed on Apr. 17, 2019, assigned to a common assignee, and which are incorporated by reference in their entirety.

TECHNICAL FIELD

The present disclosure relates to a power converter and a method of operating the same. In particular, the present disclosure relates to a hybrid power converter for performing multi-level DC-DC conversion.

BACKGROUND

In recent years, portable computing devices including smartphones, tablets and notebooks have increased their computing power, screen resolution and display frame rate. These advancements have been enabled by sub-micron range silicon technology approaching 10 nm and below and allowing the formation of ultra-narrow gate structures. Ultra-narrow gate structures exhibit increased leakage current for each transistor.

In view of the fact that central processing units (CPUs) and graphical processing units (GPUs) are composed from multiple hundred million transistors, the leakage current of a modern microprocessor is significant. To reduce battery consumption, the embedded computing cores are typically disconnected from the power supply as often as possible. As a result, the required computing power is provided within short bursts of operation. Hence, the power profile of a modern mobile computing device is dominated by relatively long periods of standby currents in the mA range, interrupted by pulses of high peak currents (in the 20 A and higher range).

Smartphones and tablet computers are typically powered with a Li-Ion battery pack having a nominal output voltage of 3.6V. The CPU and GPUs produced from silicon technology with gate lengths of 10 nm and below requires a supply voltage of about 0.9V. The corresponding voltage step-down converter needs to optimize its efficiency around a typical $V_{out}/V_{in}$ conversion ratio of 0.9V/3.6V=0.25. For such a conversion ratio traditional 2-levels and 3 levels buck converters exhibit significant conversion losses. The Dual-Stage 3-level capacitive divider as described in the publication titled "Zero Inductor Voltage Multilevel Bus Converter" IEEE 2018 by Samuel Webb, is unregulated and provides a conversion ratio of 0.25 only. However, a modified control system can be designed to regulate the output voltage with a conversion ratio above and below 0.25. Such a system however would still be limited by significant losses above and below 0.25. Therefore, there is a need for a power converter with reduced losses when operating with high conversion ratios.

SUMMARY

It is an object of the disclosure to address one or more of the above-mentioned limitations. According to a first aspect of the disclosure, there is provided a power converter having a ground terminal, an input terminal for receiving an input voltage and an output terminal for providing an output voltage with a target conversion ratio, the power converter comprising a first, a second and a third flying capacitor coupled to a network of switches and a driver; the network of switches comprising a first switch coupled to the input terminal; a second switch to couple the first flying capacitor to the third flying capacitor; a third switch to couple the second flying capacitor to the third flying capacitor; a first ground switch to couple the first flying capacitor to ground; a second ground switch to couple the second flying capacitor to ground; and a third ground switch to couple the third flying capacitor to ground; the driver being adapted to drive the network of switches with a sequence of states during a drive period, the sequence of states comprising a first state and a second state, wherein in the first state the ground terminal is coupled to the output terminal via a first path comprising the first flying capacitor and the third flying capacitor, and via a second path comprising the second flying capacitor.

Optionally, in the second state the input terminal is coupled to the output terminal via a third path comprising the second flying capacitor and the third flying capacitor, and the ground terminal is coupled to the output terminal via a fourth path comprising the first flying capacitor.

Optionally, each one of the first flying capacitor and the second flying capacitor has a first terminal selectively coupled to the third flying capacitor and a second terminal selectively coupled to the ground; wherein the network of switches comprises a fourth switch coupled to the first terminal of the first flying capacitor; and a fifth switch coupled to the first terminal of the second flying capacitor.

Optionally, the network of switches comprises a sixth switch coupled to the second terminal of the first flying capacitor; and a seventh switch coupled to the second terminal of the second flying capacitor.

Optionally, the power converter comprises an inductor coupled to the output terminal.

Optionally, the second path and the fourth path comprise the inductor.

Optionally, the inductor has a first terminal coupled to the fourth and fifth switches and a second terminal coupled to the sixth and seventh switches.

Optionally, the power converter comprises a de-magnetization switch to couple the first terminal of the first inductor to ground.

Optionally, the inductor has a first terminal coupled to the first flying capacitor via the fourth and sixth switches and to the second flying capacitor via the fifth and seventh switches.

Optionally, the power converter comprises a first inductor and a second inductor both coupled to the output terminal; wherein the first inductor has a first terminal coupled to the second terminal of the first flying capacitor, and wherein the second inductor has a first terminal coupled to the second terminal of the second flying capacitor.

Optionally, wherein in the first state the ground terminal is coupled to the output terminal via an additional path comprising the second inductor; and wherein in the second state the ground terminal is coupled to the output terminal via another additional path comprising the first inductor.

Optionally, the fourth and the fifth switches are coupled to the output terminal.

Optionally, the first terminal of the first inductor is coupled to the second flying capacitor via the fifth switch and wherein the first terminal of the second inductor is coupled to the first flying capacitor via the fourth switch.

Optionally, the sequence comprises an intermediate state, the driver being adapted to select the intermediate state among a plurality of intermediate states based on the target conversion ratio.

Optionally, the power converter comprises an inductor, wherein the intermediate state is a magnetization state in which one of the input terminal and the ground terminal is coupled to the output terminal via a magnetization path.

Optionally, the magnetization path comprises the third flying capacitor and the inductor.

Optionally, the power converter comprises an inductor, wherein the intermediate state is a de-magnetization state in which the inductor is coupled to ground.

Optionally, wherein in the de-magnetization state the driver is adapted to close at least one of the first ground switch and the second ground switch.

Optionally, the driver is adapted to maintain the first state and the second state for a predetermined duration during the drive period.

Optionally, the driver is adapted to change a duration of the intermediate state based on the target conversion ratio.

According to a second aspect of the disclosure, there is provided a method of converting power with a target conversion ratio, the method comprising providing a ground terminal, an input terminal for receiving an input voltage and an output terminal for providing an output voltage; providing a first, a second and a third flying capacitor coupled to a network of switches; the network of switches comprising a first switch coupled to the input terminal; a second switch to couple the first flying capacitor to the third flying capacitor; a third switch to couple the second flying capacitor to the third flying capacitor; a first ground switch to couple the first flying capacitor to ground; a second ground switch to couple the second flying capacitor to ground; and a third ground switch to couple the third flying capacitor to ground; and driving the network of switches with a sequence of states during a drive period, the sequence of states comprising a first state and a second state; wherein in the first state the ground terminal is coupled to the output terminal via a first path comprising the first flying capacitor and the third flying capacitor, and via a second path comprising the second flying capacitor.

Optionally, in the second state the input terminal is coupled to the output terminal via a third path comprising the second flying capacitor and the third flying capacitor, and wherein the ground terminal is coupled to the output terminal via a fourth path comprising the first flying capacitor.

The method according to the second aspect of the disclosure may share any of the features of the first aspect, as noted above and herein.

BRIEF DESCRIPTION OF THE DRAWINGS

The disclosure is described in further detail below by way of example and with reference to the accompanying drawings, in which:

FIG. 13 is a flow chart of a method for converting power with a target conversion ratio according to the disclosure.

DESCRIPTION

Figure 1A:
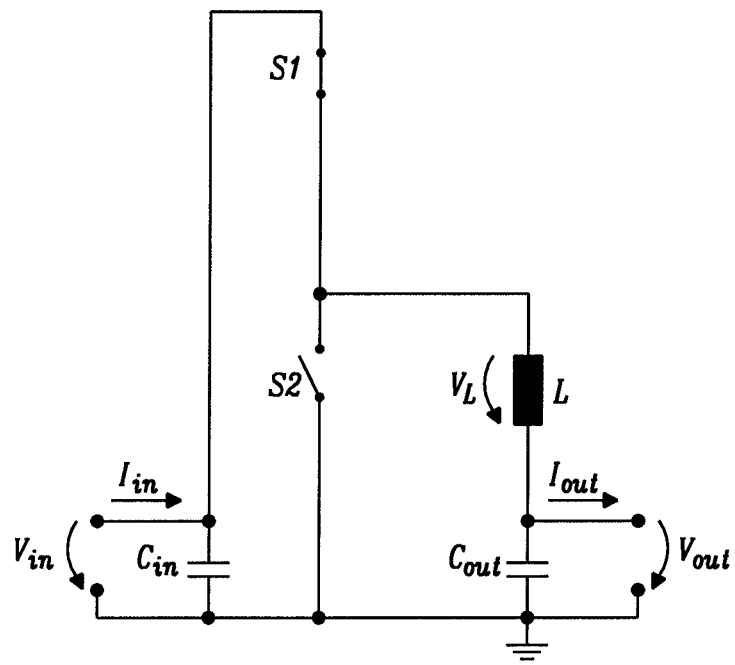
FIG. 1A is a diagram of a two-levels Buck converter.
Figure 1B:
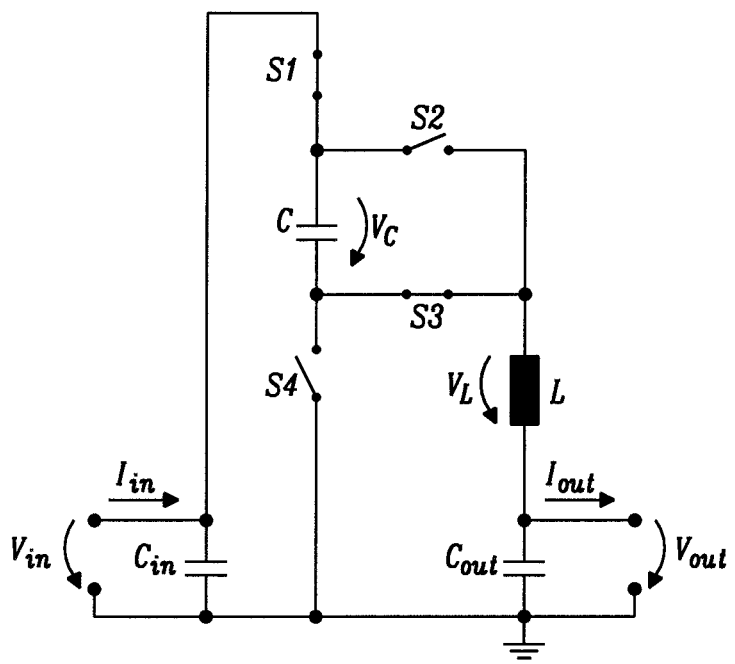
FIG. 1B is a diagram of a three-levels Buck converter.
Figure 1C:
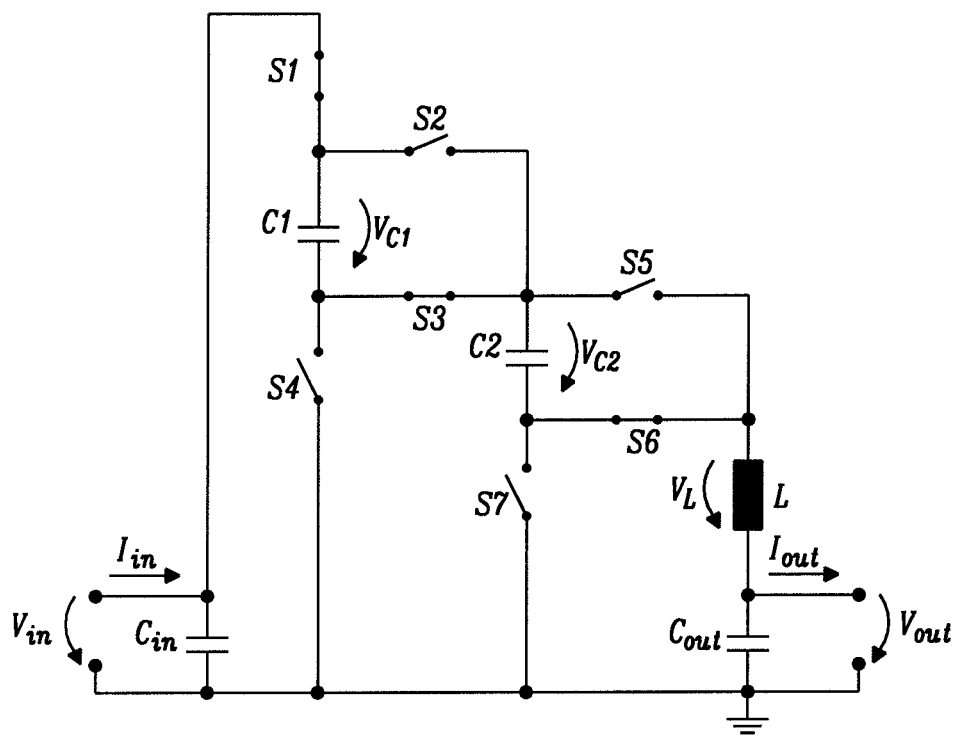
FIG. 1C is a diagram of a dual-stage three-levels Buck converter.
Figure 1D:
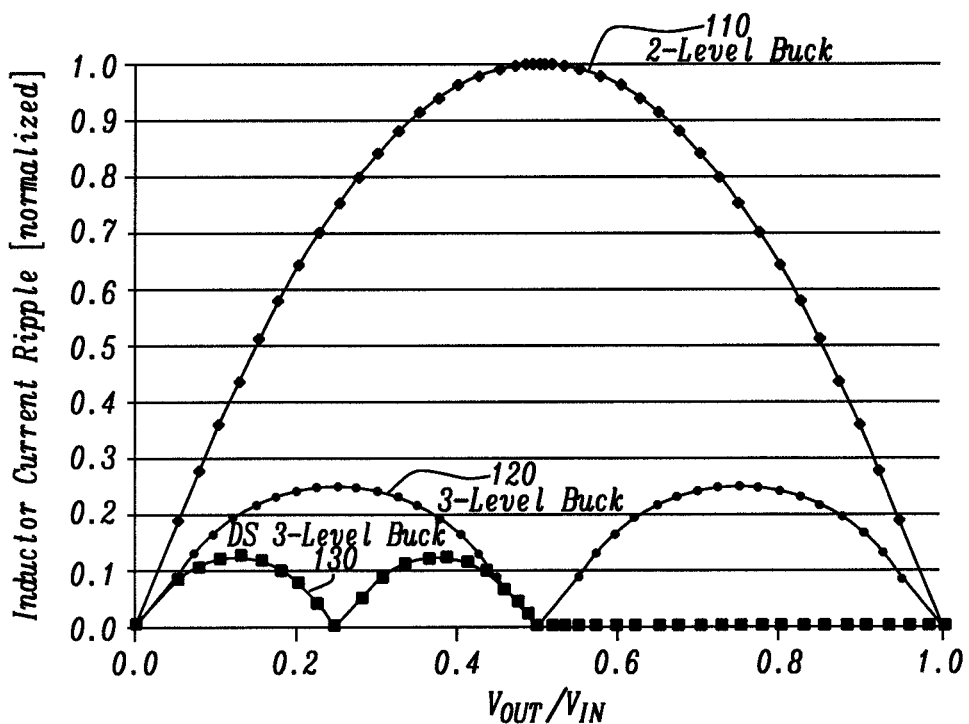
FIG. 1D is a simulation of the inductor current ripple of the converters of FIGS. 1A, 1B and 1C as a function of conversion ratio.

FIGS. 1A and 1B show the topologies of traditional two-levels and three-levels Buck converters. FIG. 1C illustrates a 4:1 capacitive divider or Dual-Stage 3-level converter as described in "Zero Inductor Voltage Multilevel Bus Converter" IEEE 2018 by Samuel Webb. Using a suitable control system, such a converter topology may as well be used to provide an output voltage over a range of conversion ratios. Conversion losses are proportional to the frequency of the inductor current ripple and to the square of the current ripple amplitude. Regulated switching DC-DC converters may minimize conversion losses by lowering switching frequency and inductor current ripples. FIG. 1D is a simulation of the inductor current ripple as a function of conversion ratio obtained for the converters of FIGS. 1A, 1B and 1C.

The normalized inductor current ripple traces 110 and 120 are shown for the 2-Level Buck converter and the 3-level Buck converter respectively. For a conversion ratio $V_{out}/V_{in}$=0.25, the 2-Level Buck displays 75% of its peak inductor current ripple. This requires either high switching frequency which is reducing converter efficiency, or a large inductance hence a large inductor. For a given inductor form factor this would result in increased Direct Current Resistance (DCR) and increased conduction loss, ultimately reducing converter efficiency. Hybrid converter topologies such as the 3-levels Buck converter are typically reducing the inductor ripple at $V_{out}/V_{in}$=0.25 by a factor 3. Compared with the 2-level Buck converter this corresponds to switching frequency that is three times lower or an inductance three times lower. However, for a conversion ratio $V_{out}/V_{in}$=0.25, the inductor current ripple remains significant and is at its highest amplitude for the 3-Level Buck converter topology.

The Dual-Stage 3-level converter shows a reduced inductor current ripple regardless of the $V_{out}/V_{in}$ conversion ratio. The inductor current ripple is null for a conversion ratio of 0.25. In operation the Dual-Stage 3-level converter is pulling 100% of the output current from the input port during a 25% duty cycle. This result in increased conduction losses ($I^2R$) and increased noise. In addition, the flying capacitance C2 needs to be sufficiently large to carry a current twice as large as the current across the flying capacitance C1.

Figure 2A:
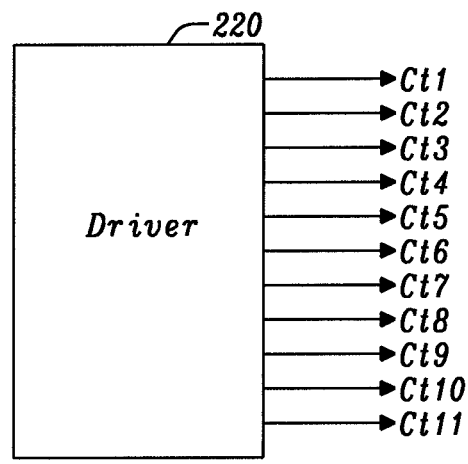
FIGS. 2A and 2B are diagrams of a DC-DC converter according to the disclosure.
Figure 2B:
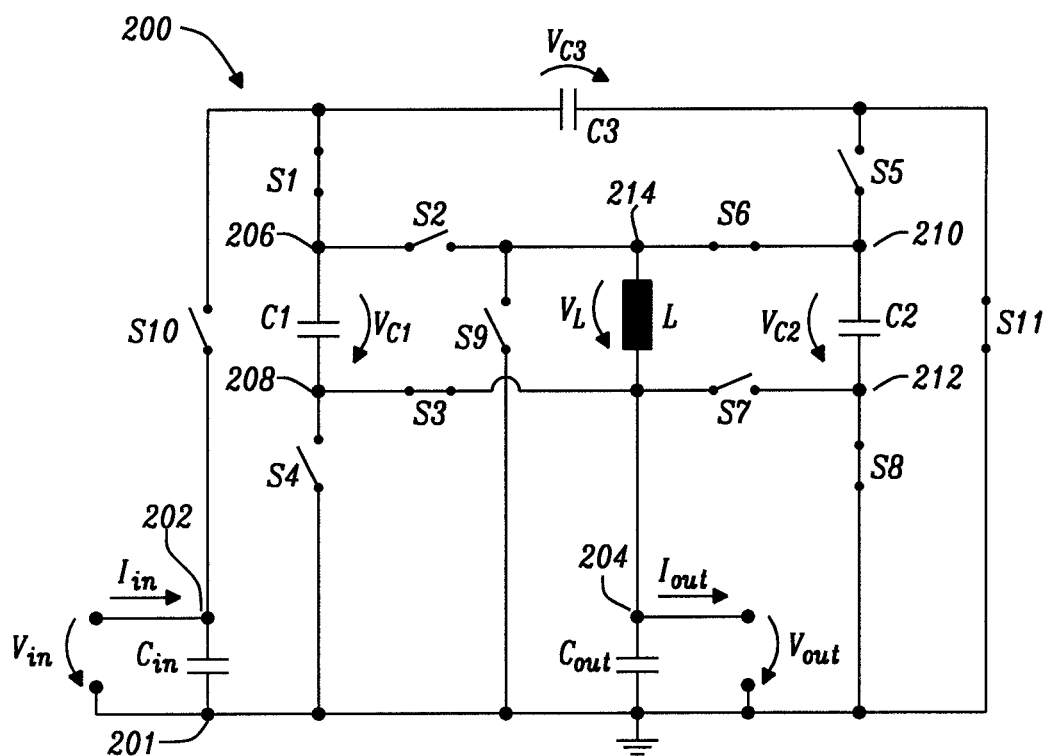

FIG. 2B is a diagram of a DC-DC converter 200 according to the disclosure allowing to reduce inductor core losses and/or effective ($I^2R$) conduction losses. The DC-DC converter 200 includes three capacitors C1, C2 and C3 and an inductor L coupled between an input node 202 and an output node 204 via a network of switches formed by eleven switches S1-S11. An input capacitor Cin is provided between the input node 202 and ground and an output capacitor Cout is provided between the output node 204 and ground. The capacitors Cin and Cout are connected to a fixed ground voltage and may be referred to as reservoir capacitors. The capacitors C1, C2 and C3 have terminals provided with varying voltages and may be referred to as flying capacitors.

The first flying capacitor C1 has a first terminal coupled to node 206 and a second terminal coupled to node 208. The second flying capacitor C2 has a first terminal coupled to node 210 and a second terminal coupled to node 212. The third flying capacitor C3 has a first terminal coupled to the input node 202 via switch S10 and a second terminal coupled to ground via switch S11. The first flying capacitor is coupled to the first terminal of C3 via the switch S1 and to ground via the switch S4. Similarly, the second flying capacitor C2 is coupled to the second terminal of C3 via the switch S5 and to ground via the switch S8. The inductor L has a first terminal at node 214 and a second terminal coupled to the output node 204. The first terminal of the inductor at node 214 is coupled to node 206 via the switch S2, to node 210 via the switch S6. Optionally, the first terminal of the inductor may also be coupled to ground via the de-magnetization switch S9. The second terminal of the inductor is coupled to node 208 via the switch S3 and to node 212 via the switch S7.

A driver 220 in FIG. 2A is provided to generate a plurality of control signals Ct1-Ct11 to operate the switches S1-S11 respectively. In specific states, the driver is configured to performed so called interleaved switching, such that when the first flying capacitor pulls a current from the input, the second flying capacitor pulls a current from ground and vice versa.

The DC-DC converter 200 in FIG. 2B may be used for different conversion ratios and provides improved efficiency compared with traditional converters for a conversion ratio of $$\frac{V_{out}}{V_{in}} \leq \frac{1}{4}.$$

The voltage $V_{C3}$ across C3 may be regulated to $V_{in}/2$. In this case, the voltages $V_{C1}$ and $V_{C2}$ across the flying capacitors C1 and C2 are defined by equation 1 as:

$$V_{C1} = V_{C2} = V_{in}/2 - V_{out} \quad (1)$$

The voltage $V_L$ across L can be expressed as:

$$V_L = V_{C2} - V_{out} \quad (2)$$

Therefore $V_L$ may be either positive or negative depending on the value of $V_{Out}$.

The DC-DC converter 200 in FIG. 2B may dissipate energy due to conduction losses through the switches, the inductor and the flying capacitors as well as core losses due to energy dissipated through the core of the inductor L. When the conversion ratio is $$\frac{V_{out}}{V_{in}} = \frac{1}{4},$$

$V_{C1} = V_{C2} V_{in}/4$ and $V_L = 0$. As a result the DC-DC converter has no inductor core losses. The low side switches S3, S4, S7 and S8 are rated for a voltage $V_{out}$. The input switch S10 may be operated (switched off) to isolate the converter during input over-voltage conditions. As a result, a reduced voltage rating may be used for the cascaded converter switches S1 and S5.

The driver 220 in FIG. 2A operates the converter 200 in FIG. 2B using a sequence of two or more states selected among a plurality of states depending on the chosen conversion ratio. For a conversion ratio $$\frac{V_{out}}{V_{in}} = \frac{1}{4},$$

the sequence includes two main states referred to as states A and B respectively.

Figure 3A:
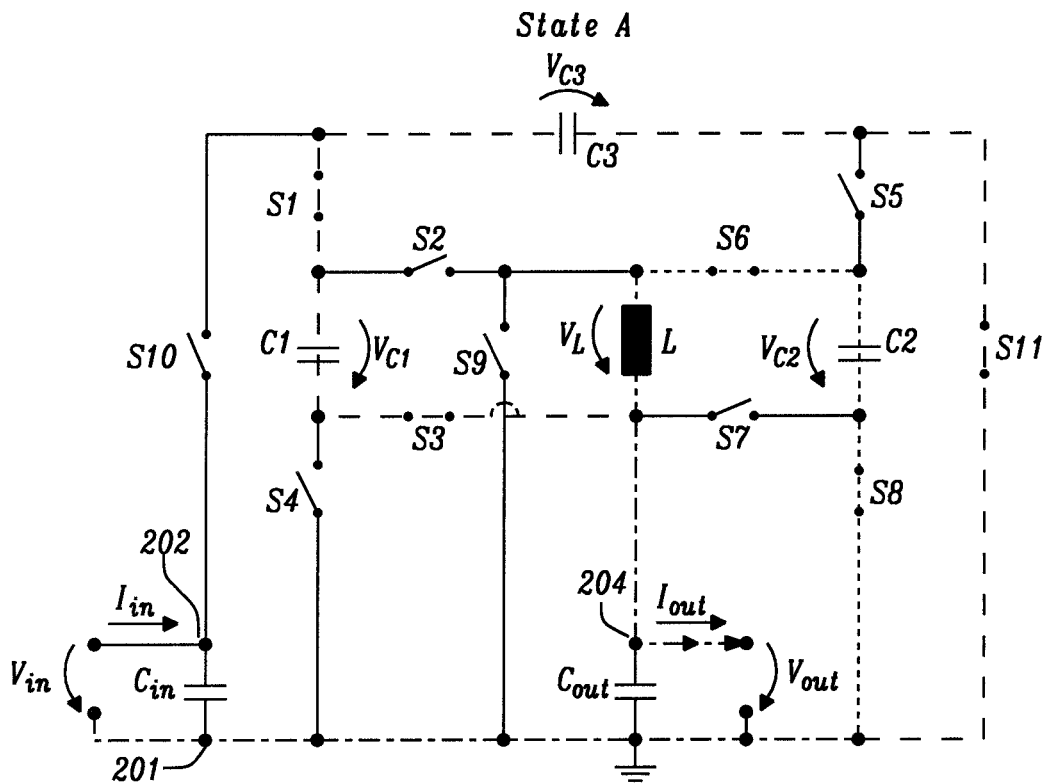
FIG. 3A is a diagram of the DC-DC converter of FIG. 2B operating in a first state.

FIG. 3A illustrates the DC-DC converter of FIG. 2 operating in a first main state also referred to as state A, in which the switches S1, S3, S6, S8 and S11 are closed while the remaining switches S2, S4, S5, S7, S9 and S10 are open.

In state A the ground node 201 is coupled to the output node 204 via a first path comprising S11, C3, S1, C1, S3, hence bypassing inductor L. The ground node 201 is also coupled to the output node 204 via a second path that includes the switch S8, the second flying capacitor C2, the switch S6 and the inductor L.

Figure 3B:
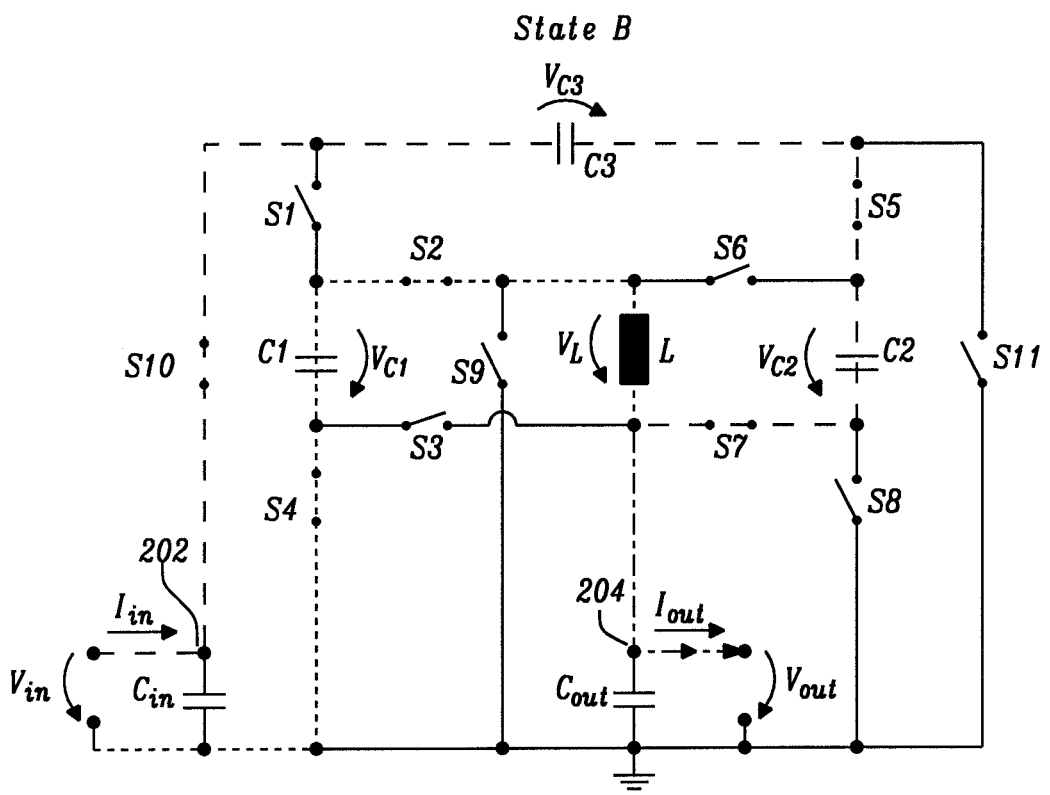
FIG. 3B is a diagram of the DC-DC converter of FIG. 2B operating in a second state.

FIG. 3B illustrates the DC-DC converter of FIG. 2 operating in a second state referred to as state B. In state B the switches S2, S4, S5, S7 and S10 are closed while the remaining switches S1, S3, S6, S8, S9 and S11 are open. The input node 202 is coupled to the output node 204 via a third path comprising S10, C3, S5, C2, and S7, hence bypassing inductor L. The ground node 201 is coupled to the output node 204 via a fourth path comprising S4, C1, S2 and L.

Figure 4:
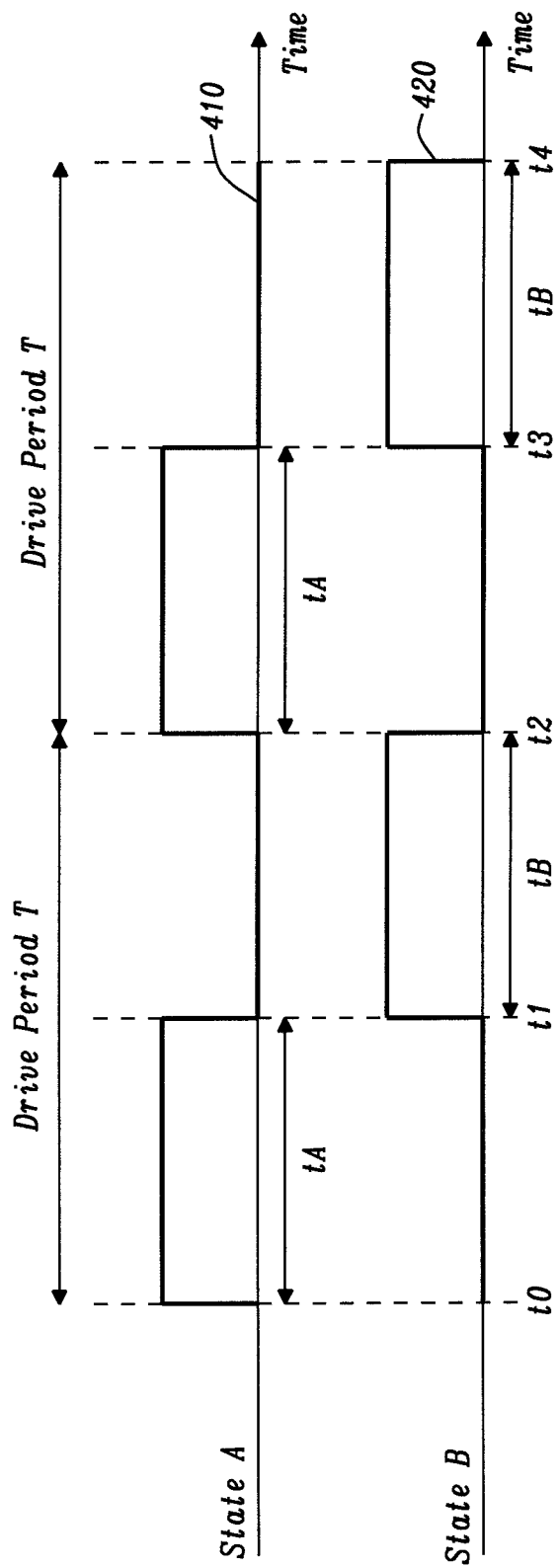
FIG. 4 is an exemplary drive sequence for operating the DC-DC converter of FIG. 2B.

FIG. 4 illustrates a drive sequence for operating the DC-DC converter of FIG. 2 with a conversion ratio $$\frac{V_{in}}{V_{out}} = 4.$$

In this example, the driver 220 drives the DC-DC converter 200 with state A (waveform 410), between the times t0 and t1 for a duration TA, then with state B (waveform 420) between the time t1 and t2 for a duration TB. This sequence is then repeated over time to deliver the required output power. It will be appreciated that a delay also referred to as dead-time may be introduced at times t1 and t2. For a conversion ratio $$\frac{V_{in}}{V_{out}} = 4,$$

TA=TBs=T/2 and the driver operates the DC-DC converter for 50% of the time in state A and 50% of the time in state B. As a result 50% of the current provided at the output of the DC-DC regulator does not go through the inductor L. This reduces inductor losses by 75% compared with a conventional DC-DC converter. Using this approach the peak current per switch is also reduced, therefore decreasing the conduction losses ($I^2R$).

For a conversion ratio $$\frac{V_{out}}{V_{in}} > \frac{1}{4},$$

the driving sequence includes the main states A and B and at least one intermediate magnetization state.

Figure 5A:
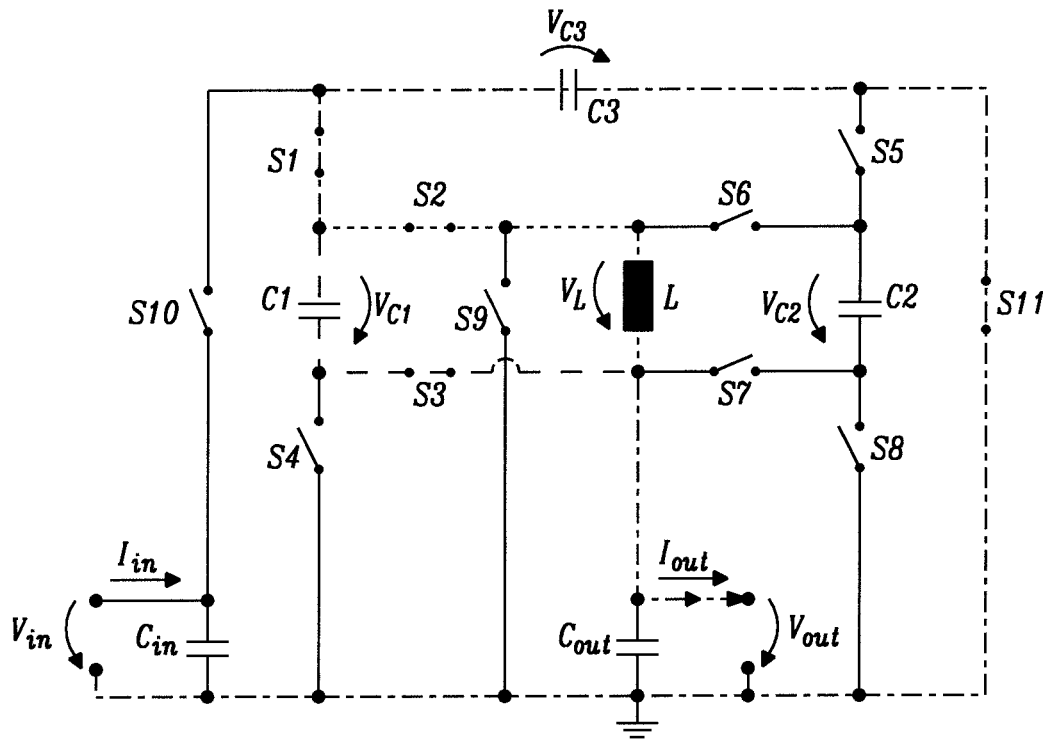
FIG. 5A is a diagram of the DC-DC converter of FIG. 2B operating in an intermediate magnetization state.

FIG. 5A illustrates the DC-DC converter of FIG. 2 operating in a magnetization state referred to as state I1. In state I1 the switches S1, S2, S3 and S11 are closed while the remaining switches S4, S5, S6, S7, S8, S9 and S10 are open. The ground node 201 is coupled to the output node 204 via a fifth path that includes S11, C3, S1, S2 and L and optionally via the first path (S11, C3, S1, C1, S3).

Figure 5B:
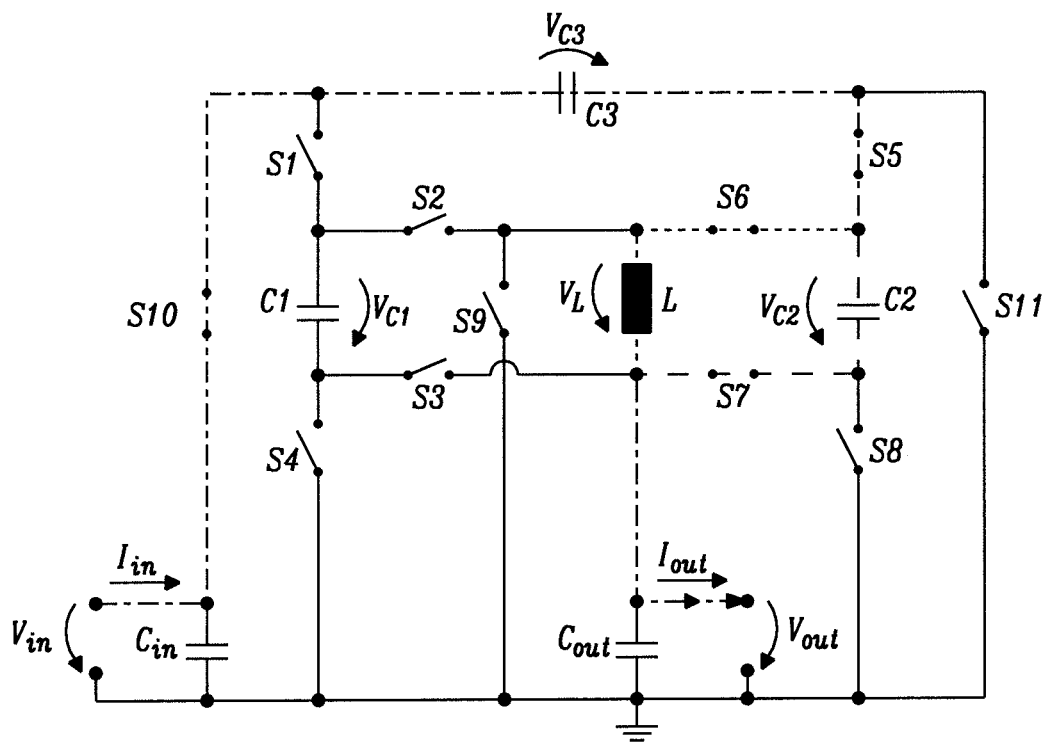
FIG. 5B is a diagram of the DC-DC converter of FIG. 2B operating in another intermediate magnetization state.

FIG. 5B illustrates the DC-DC converter of FIG. 2 operating in another magnetization state referred to as state I2. In state I2 the switches S5, S6, S7 and S10 are closed while the remaining switches S1, S2, S3, S4, S8, S9 and S11 are open. The input node 202 is coupled to the output node 204 via a sixth path that includes S10, C3, S5, S6 and L and optionally via the third path (S10, C3, S5, C2, S7).

For a conversion ratio $$\frac{V_{out}}{V_{in}} < \frac{1}{4},$$

the sequence includes the main states A and B and at least one intermediate de-magnetization state.

Figure 6A:
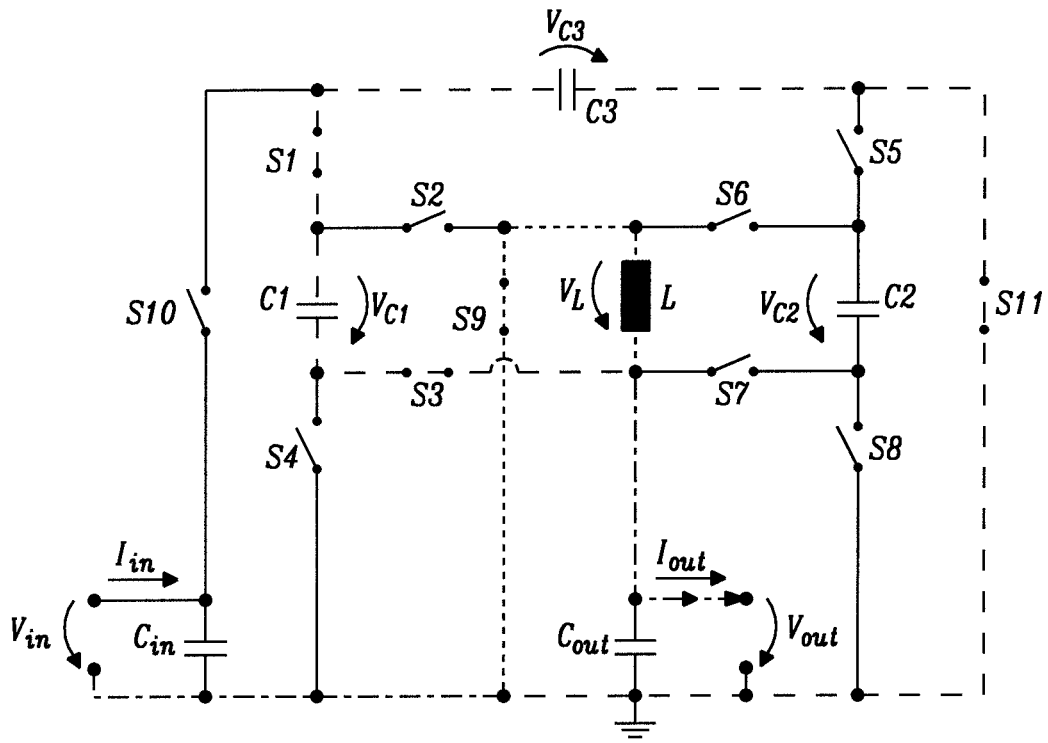
FIG. 6A is a diagram of the DC-DC converter of FIG. 2B operating in an intermediate de-magnetization state.

FIG. 6A illustrates the DC-DC converter of FIG. 2 operating in a de-magnetization state referred to as state I3. In state I3 the switches S1, S3, S9 and S11 are closed while the remaining switches S2, S4, S5, S6, S7, S8 and S10 are open. The ground node 201 is coupled to the output node 204 via a seventh path that includes S9 and L and optionally via the first path (S11, C3, S1, C1, S3).

Figure 6B:
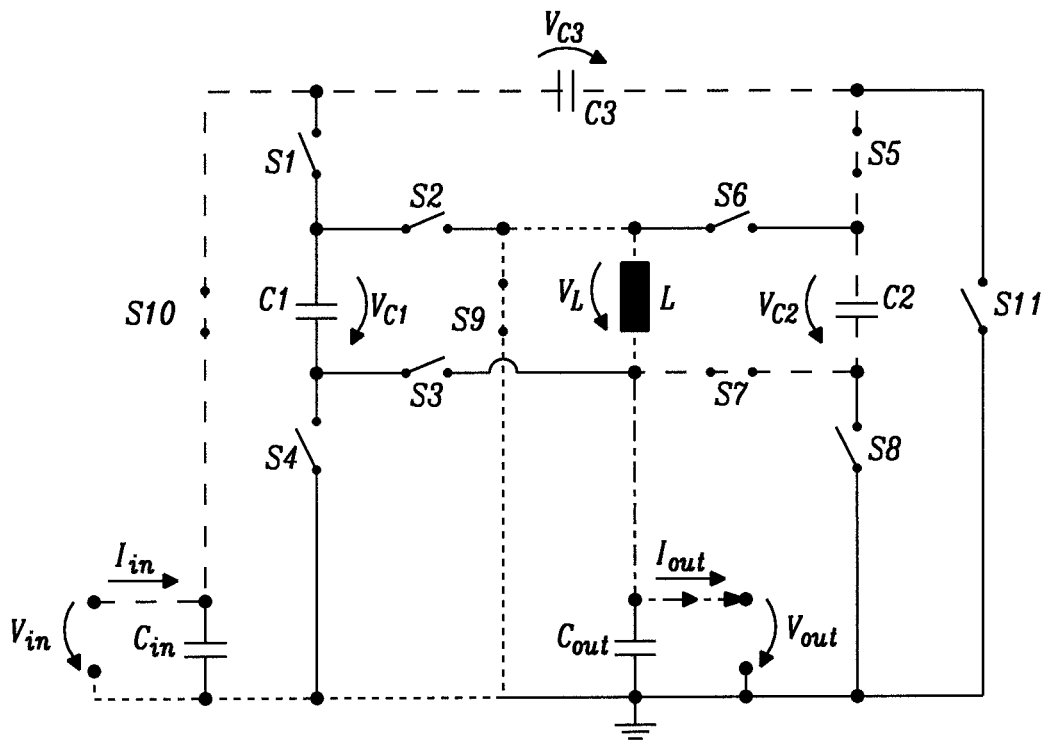
FIG. 6B is a diagram of the DC-DC converter of FIG. 2B operating in another intermediate de-magnetization state.

FIG. 6B illustrates the DC-DC converter of FIG. 2 operating in another de-magnetization state referred to as state I4. In state I4 the switches S5, S7, S9 and S10 are closed while the remaining switches S1, S2, S3, S4, S6, S8 and S11 are open. The input node 202 is coupled to the output node 204 via the seventh path that includes S9 and L and optionally via the third path (S10, C3, S5, C2, S7).

Figure 7A:
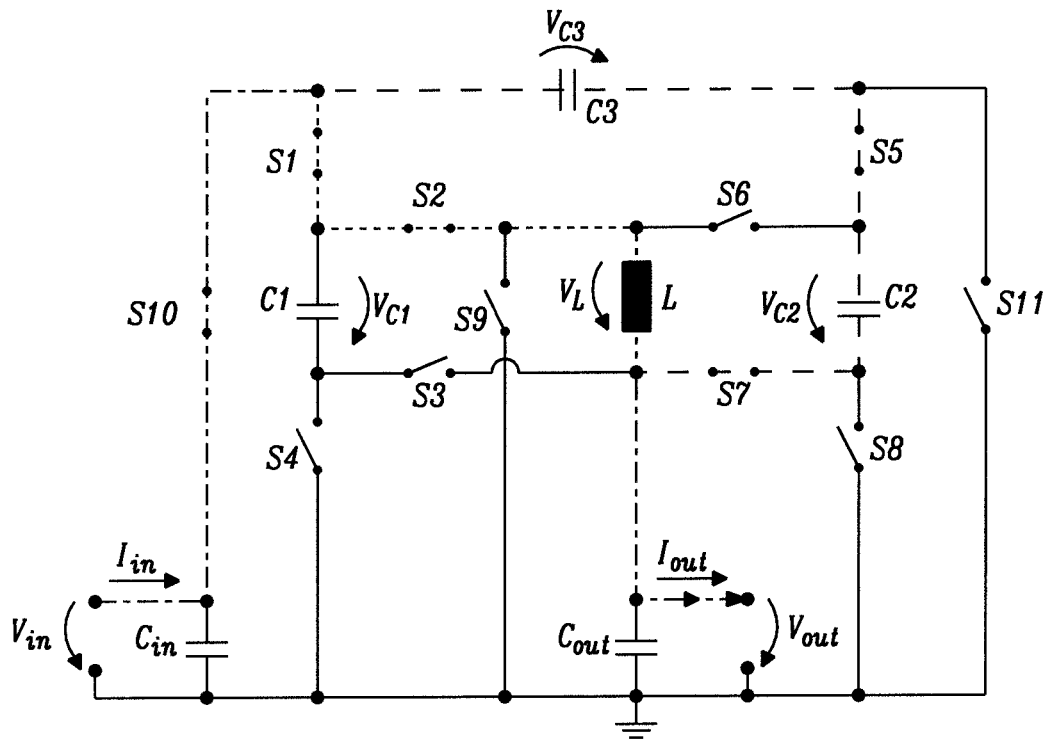
FIG. 7A is a diagram of the DC-DC converter of FIG. 2B operating in another intermediate state.

FIG. 7A illustrates the DC-DC converter of FIG. 2 operating in an intermediate state referred to as state I5. In state I5 the switches S1, S2, S5, S7 and S10 are closed while the remaining switches S3, S4, S6, S8, S9 and S11 are open. The input node 202 is coupled to the output node 204 via an eight path that includes S10, S1, S2 and L and optionally via the third path (S10, C3, S5, C2, S7). The intermediate state I5 may be used to accelerate inductor magnetization.

Figure 7B:
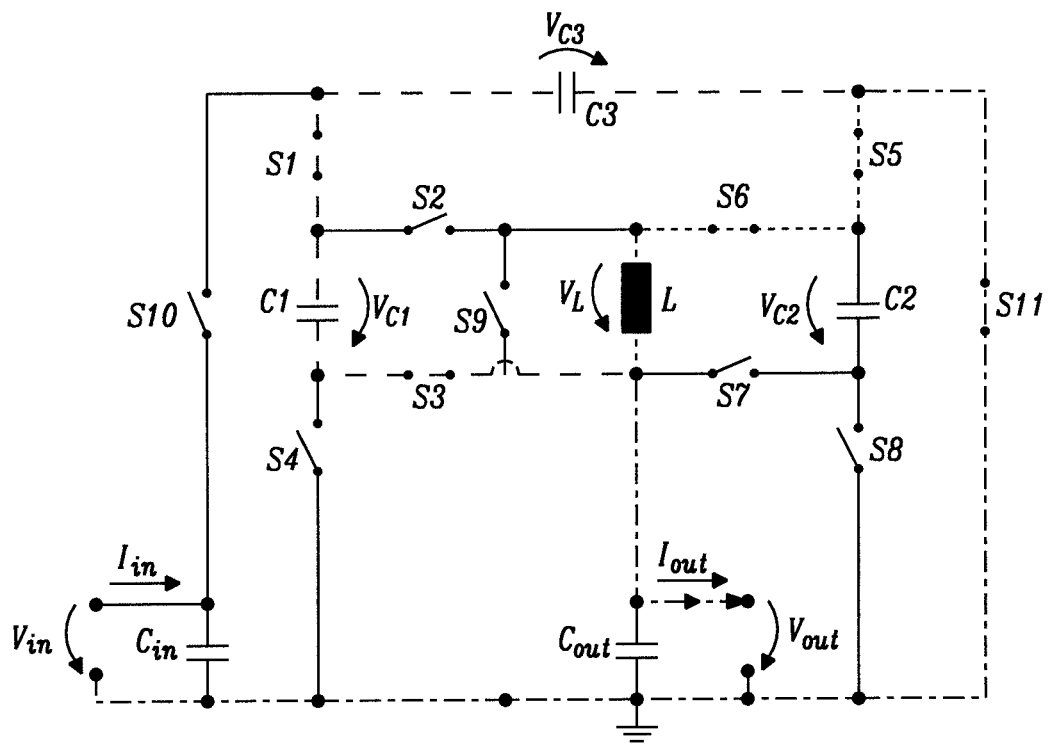
FIG. 7B is a diagram of the DC-DC converter of FIG. 2B operating in yet another intermediate state.

FIG. 7B illustrates the DC-DC converter of FIG. 2 operating in another intermediate state referred to as state I6. In state I6 the switches S1, S3, S5, S6 and S11 are closed while the remaining switches S2, S4, S7, S8, S9 and S10 are open. The ground node 201 is coupled to the output node 204 via a ninth path that includes S11, S5, S6 and L and optionally via the first path (S11, C3, S1, C1, S3). The intermediate state I6 may be used to enable a converter without the need for switch S9.

Figure 8:
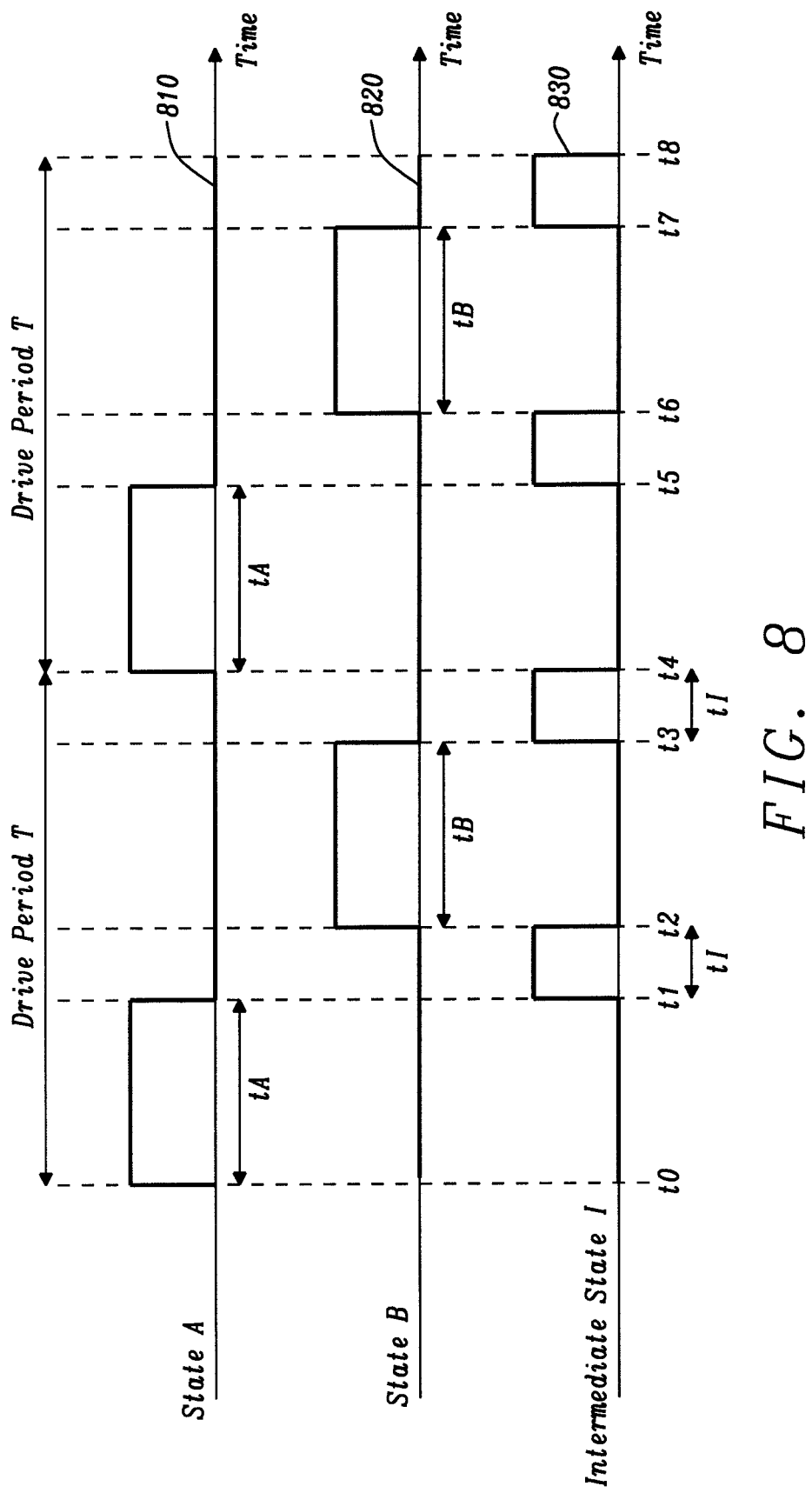
FIG. 8 is another exemplary drive sequence for operating the DC-DC converter of FIG. 2B.

FIG. 8 illustrates another drive sequence for operating the DC-DC converter of FIG. 2. In this example, the driver drives the DC-DC converter with state A (waveform 810), between the times t0 and t1 for a duration TA, with the intermediate state I (waveform 830) between the times t1 and t2 for a duration TI, with state B (waveform 820) between the times t2 and t3 for a duration TB, and then with the intermediate state I between the times t3 and t4. This sequence is then repeated over time to deliver the required output power. It will be appreciated that a dead-time may be introduced at times t1, t2, t3 and t4.

Depending on the target conversion ratio, the driver 220 may select the intermediate state I among the intermediate magnetization states I1 and I2 or the de-magnetization states I3 and I4 or the intermediate states I5 and I6. For instance for a conversion ratio $$\frac{V_{out}}{V_{in}} > \frac{1}{4},$$

the DC-DC converter should be operated for a predetermined amount of time in the intermediate magnetization state I1 or I2. Similarly, for a conversion ratio $$\frac{V_{out}}{V_{in}} < \frac{1}{4},$$

the DC-DC converter should be operated for a predetermined amount of time in the intermediate de-magnetization state I3 or I4.

The values of TA, TB and TI may be set to achieve a desired conversion ratio. For instance TA=TB may be set to 40% of the drive period T, and TI may be set to 10% of T such that TA+TB+2TI=T. It will also be appreciated that the driver may select different intermediate state in a same sequence. For instance for a conversion ratio $$\frac{V_{out}}{V_{in}} < \frac{1}{4},$$

a possible sequence may start with State A followed by State I3, then State B, and finish with State I4.

Figure 9:
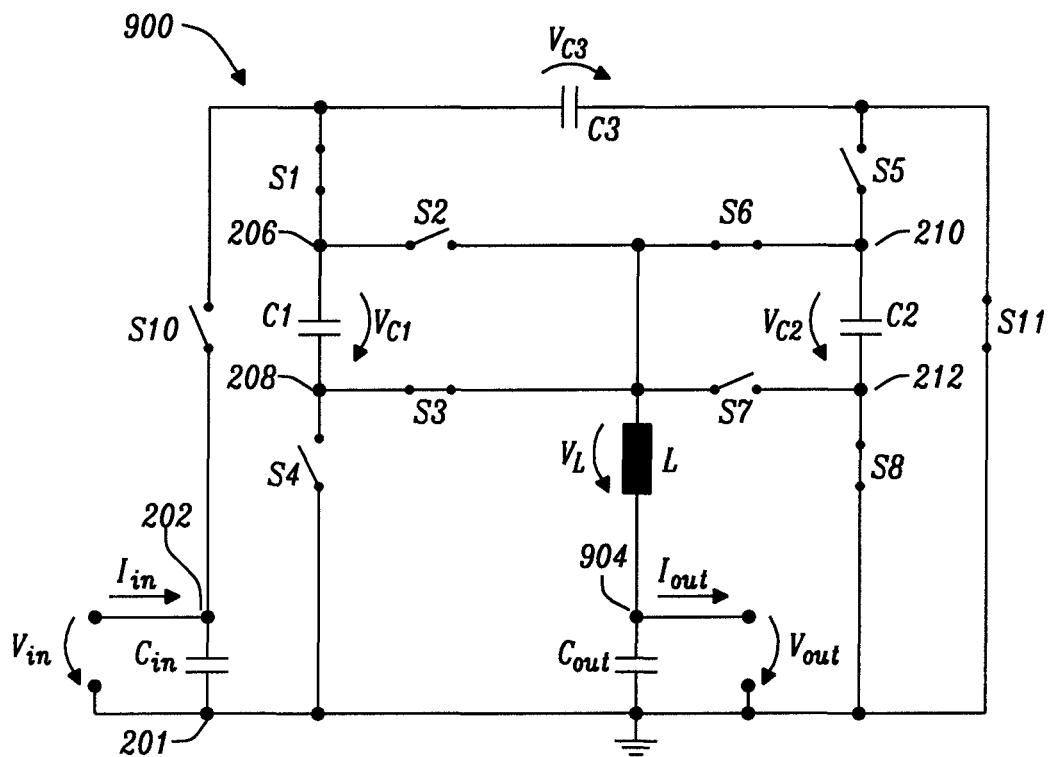
FIG. 9 is a diagram of another DC-DC converter according to the disclosure.

FIG. 9 illustrates a modified version of the converter of FIG. 2. In this implementation the first terminal of the inductor L is coupled to C1 via switches S2 and S3 and to C2 via switches S6 and S7. The DC-DC converter of FIG. 9 may implement de-magnetisation via S3 and S4 or S7 and S8 and does not require the de-magnetization switch S9. In operation, the driver operates the switches which a sequence of states that include the states A and B. The flying capacitors C1 and C2 are regulated towards $V_{in}/4$ and the voltage across the flying capacitor C3 may be controlled towards a level of $V_{in}/2$.

Figure 10:
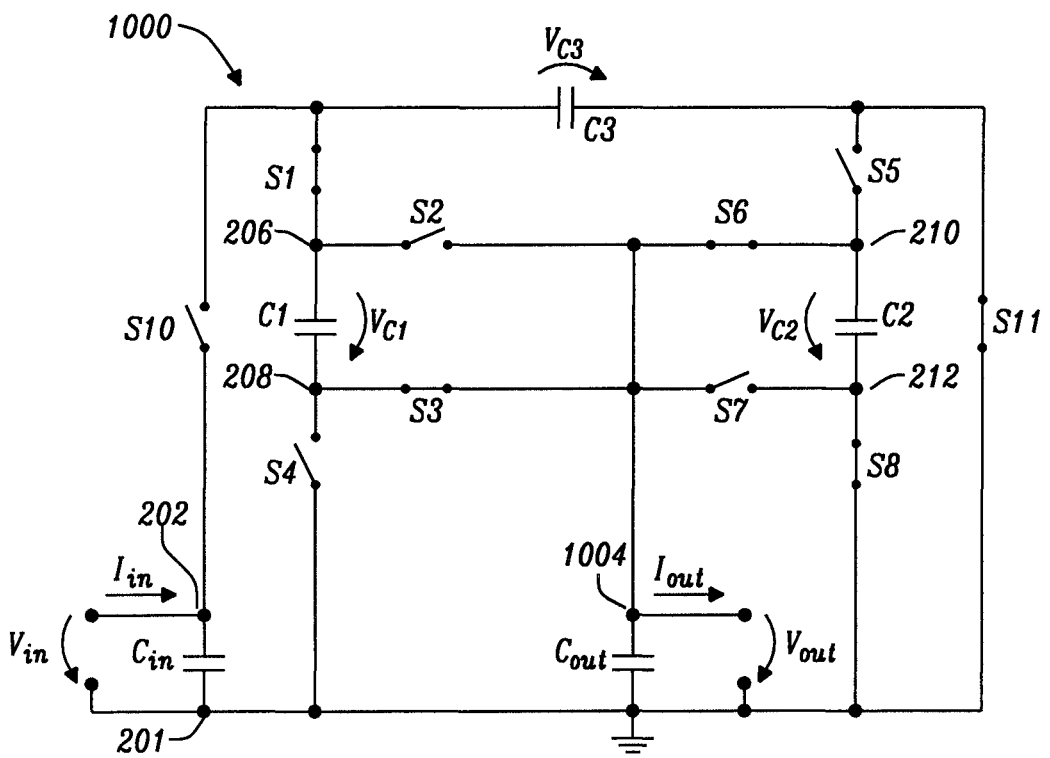
FIG. 10 is a diagram of an unregulated DC-DC converter.

FIG. 10 illustrates an unregulated DC-DC converter. The circuit 1000 is similar to the circuit of FIG. 2 but implemented without any inductor, hence providing a 4:1 (or 1:4) capacitive divider. In operation the driver operates the converter 1000 using a driving sequence formed by the states A and B as described above with respect to FIG. 2 in which the paths of states A and B do not include the inductor. Such a circuit can only operate with a conversion ratio of $$\frac{V_{out}}{V_{in}} = \frac{1}{4}$$

but can be made smaller and at a lower cost than the circuit of FIG. 2. The DC-DC converter of FIG. 2 may also be modified to improve performance in a specific conversion range.

Figure 11:
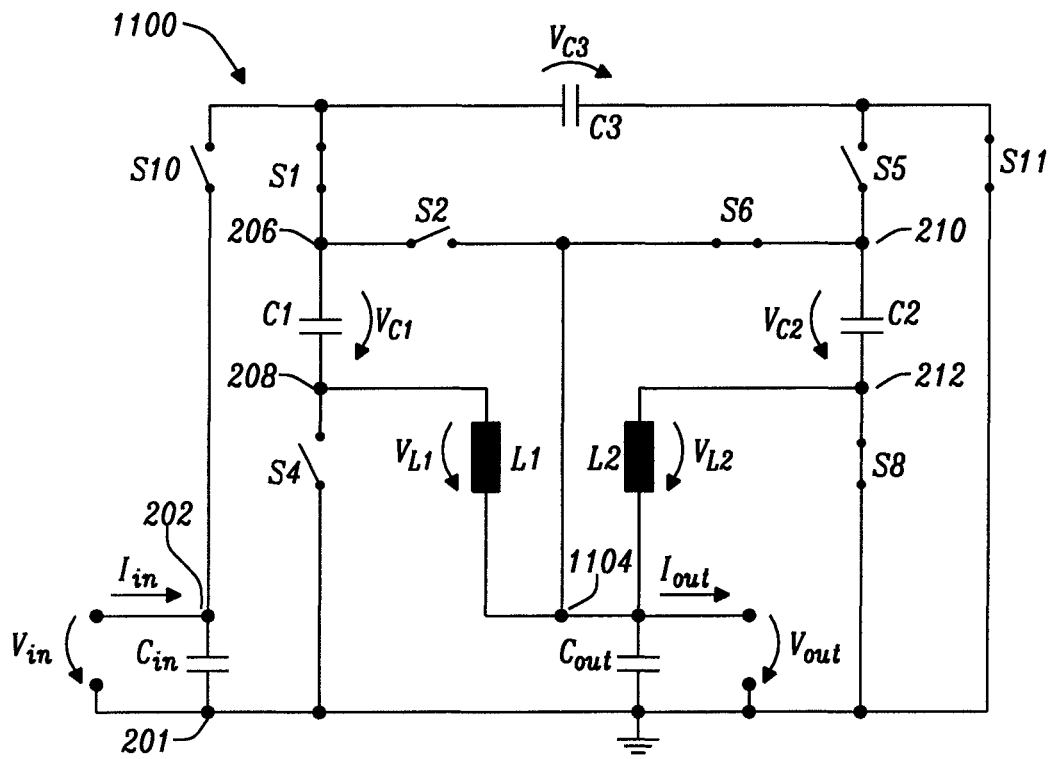
FIG. 11 is a diagram of a dual inductor DC-DC converter according to the disclosure.

FIG. 11 illustrates a diagram of a DC-DC converter 1100 designed for a condition in which the voltages across the flying capacitors C1 and C2 are $V_{C1}=V_{C2}=V_{out}$. The converter 1100 is similar to the converter 200 described with reference to FIG. 2, in which certain parts of the circuit have been added or modified. The same reference numerals have been used to represent corresponding components and their description will not be repeated for sake of brevity. The DC-DC converter 1100 is implemented with eight switches S1, S2, S4, S5, S6, S8, S10 and S11 and two inductors L1 and L2. The first inductor L1 has a first terminal coupled to C1 at node 208 and a second terminal coupled to the output node 1104. Similarly, the second inductor L2 has a first terminal coupled to C2 at node 212 and a second terminal coupled to the output node 1104. The switches S2 and S6 are both coupled to the output node 1104.

For a conversion ratio $$\frac{V_{out}}{V_{in}} \leq \frac{1}{8},$$

the driver operates the converter 1100 with a sequence formed by two main states referred to as states A' and B' and optionally D'. In state A' the ground 201 node is coupled to the output node 1104 via three paths: a path that includes S11, C3, S1, C1 and L1; another path that includes S8 and L2; and yet another path that includes S8, C2 and S6, hence bypassing inductor L1 & L2. In state B' the input node 202 is coupled to the output node 1104 via a path that includes S10, C3, S5, C2 and L2. The ground node 201 is coupled to the output node 1104 via a path that includes S4 and L1 and another path including S4, C1 and S2, hence bypassing inductor L1 & L2. The voltage across the flying capacitors is $V_{C1}=V_{C2}=V_{out}$. For a conversion ratio $$\frac{V_{out}}{V_{in}} < \frac{1}{8},$$

intermediate de-magnetization states D' are inserted. In state D' only the switches S4 and S8 are closed and L1 and/or L2 are de-magnetized. The voltage $V_{C3}$ across C3 may be regulated to $V_{C3}=V_{in}/2$.

Figure 12:
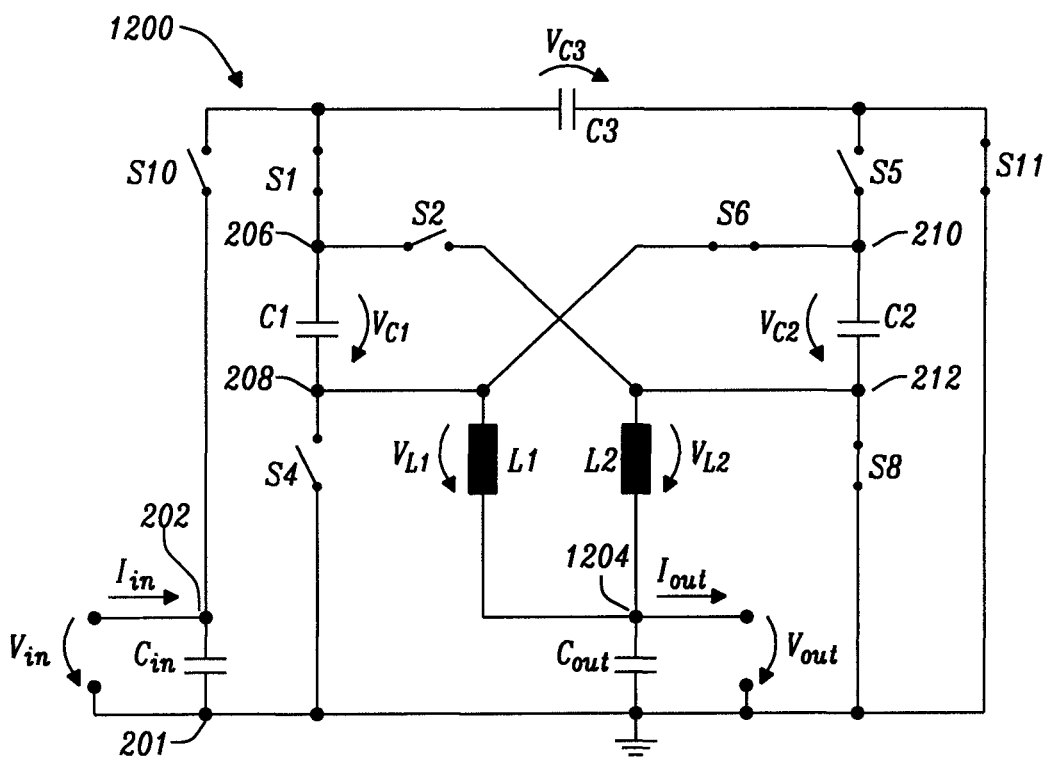
FIG. 12 is a diagram of another dual inductor DC-DC converter.

FIG. 12 illustrates a diagram of a DC-DC converter 1200 designed for a condition in which the voltages across the flying capacitors C1 and C2 are $$V_{C1} = V_{C2} = \frac{V_{in}}{4}.$$

The converter 1200 is similar to the converter 1100 described with reference to FIG. 11, in which certain parts of the circuit have been modified. The same reference numerals have been used to represent corresponding components and their description will not be repeated for sake of brevity. The DC-DC converter 1200 is implemented with eight switches S1, S2, S4, S5, S6, S8, S10 and S11 and two inductors L1 and L2. The first inductor L1 has a first terminal coupled to C1 and C2 and a second terminal coupled to the output node 1204. The first terminal of L1 is coupled to the second terminal of C1 at node 208 and to the first terminal of C2 via switch S6. Similarly, the second inductor L2 has a first terminal coupled to C1 and C2 and a second terminal coupled to the output node 1204. The first terminal of L2 is coupled to the first terminal of C1 via switch S2 and to the second terminal of C2 at node 212.

For a conversion ratio $$\frac{V_{out}}{V_{in}} \leq \frac{1}{8},$$

the driver operates the converter 1200 with a driving sequence that includes two main states referred to as states A", B" and optionally D". In state A" the switches S1, S6, S8 and S11 are closed and the switches S2, S4, S5 and S10 are open. The first inductor L1 is magnetized via paths S11, C3, S1, C1, L1 and S8, C2, S6, L1 respectively. The second inductor L2 is de-magnetized via a path that includes S8 and L2. In state B" the switches S2, S4, S5 and S10 are closed and the switches S1, S6, S8 and S11 are open. The first inductor L1 is de-magnetized and L2 is magnetized via paths S4, C1, S2, L2 and S10, C3, S5, C2, L2 respectively. For a conversion ratio $$\frac{V_{out}}{V_{in}} < \frac{1}{8},$$

intermediate de-magnetization states D" are inserted. In state D" only the switches S4 and S8 are closed and L1 and/or L2 are de-magnetized. The voltage $V_{C3}$ across C3 may be regulated to for instance $V_{C3}=V_{in}/2$.

The DC-DC converters described in relation to FIGS. 2 to 12 have been described as step-down converters also referred to as Buck converters. It will be appreciated that these converters may be operated in reverse (that is using the input as the output and the output as the input) as Boost converters to achieve step-up conversion.

FIG. 13 is a flow chart of a method for converting power with a target conversion ratio. At step 1310 a circuit is provided with a ground terminal, an input terminal for receiving an input voltage and an output terminal for delivering an output voltage.

At step 1320 three flying capacitors coupled to a network of switches. The flying capacitors are labelled first, second and a third flying capacitor respectively. The network of switches comprises a first switch coupled to the input terminal; a second switch to couple the first flying capacitor to the third flying capacitor; a third switch to couple the second flying capacitor to the third flying capacitor; a first ground switch to couple the first flying capacitor to ground; a second ground switch to couple the second flying capacitor to ground; and a third ground switch to couple the third flying capacitor to ground.

At step 1330 the network of switches is driven with a sequence of states during a drive period. The sequence of states comprises a first state and a second state. In the first state the ground terminal is coupled to the output terminal via a first path and a second path. The first path comprises the first flying capacitor and the third flying capacitor, while the second path comprises the second flying capacitor. When the circuit includes an inductor the second path also comprises the inductor.

In the second state the input terminal is coupled to the output terminal via a third path comprising the second flying capacitor and the third flying capacitor, and the ground terminal is coupled to the output terminal via a fourth path comprising the first flying capacitor and optionally the inductor.

Using this approach it is possible to improve performance for high conversion ratios, for example for a conversion ratio below $V_{out}/V_{in}=0.25$. For instance, the converter according to the disclosure permits to reduce both inductor core losses and conduction losses compared with the 2-level and 3-level Buck converters. Compared with the Dual stage 3-level Buck converter, the converter of the disclosure reduces conduction losses.

Therefore the problem of losses due to inductor core losses and/or conduction losses is addressed by providing a converter having three flying capacitors coupled to a network of switches. The network of switches comprises a first switch coupled to the input terminal of the converter, a second switch to couple the first flying capacitor to the third flying capacitor; a third switch to couple the second flying capacitor to the third flying capacitor; a first ground switch to couple the first flying capacitor to ground; a second ground switch to couple the second flying capacitor to ground; and a third ground switch to couple the third flying capacitor to ground.

A skilled person will appreciate that variations of the disclosed arrangements are possible without departing from the disclosure. For instance the flying capacitors may be implemented as single or multiple capacitors connected in series and/or in parallel. Alternatively a capacitor network may be used. Such a capacitor network may change configuration during the operation of the converter. Accordingly, the above description of the specific embodiment is made by way of example only and not for the purposes of limitation. It will be clear to the skilled person that minor modifications may be made without significant changes to the operation described.

What is claimed is:

1. A power converter having a ground terminal, an input terminal for receiving an input voltage and an output terminal for providing an output voltage with a target conversion ratio, the power converter comprising
a first, a second and a third flying capacitor coupled to a network of switches and a driver; the network of switches comprising
a first switch coupled to the input terminal;
a second switch to couple the first flying capacitor to the third flying capacitor;
a third switch to couple the second flying capacitor to the third flying capacitor;
a first ground switch to couple the first flying capacitor to ground;
a second ground switch to couple the second flying capacitor to ground; and
a third ground switch to couple the third flying capacitor to ground;
the driver being adapted to drive the network of switches with a sequence of states during a drive period, the sequence of states comprising a first state and a second state, wherein in the first state the ground terminal is coupled to the output terminal via a first path and a second path simultaneously, wherein the first path comprises the first flying capacitor coupled in series with the third flying capacitor and bypasses the second flying capacitor, and wherein the second path comprises the second flying capacitor and bypasses the first capacitor and the third capacitor.

2. The power converter as claimed in claim 1, wherein in the second state the input terminal is coupled to the output terminal via a third path comprising the second flying capacitor and the third flying capacitor, and wherein the ground terminal is coupled to the output terminal via a fourth path comprising the first flying capacitor.

3. The power converter as claimed in claim 2, wherein each one of the first flying capacitor and the second flying capacitor has a first terminal selectively coupled to the third flying capacitor and a second terminal selectively coupled to the ground; wherein the network of switches comprises
a fourth switch coupled to the first terminal of the first flying capacitor; and
a fifth switch coupled to the first terminal of the second flying capacitor.

4. The power converter as claimed in claim 3, wherein the network of switches comprises
a sixth switch coupled to the second terminal of the first flying capacitor; and
a seventh switch coupled to the second terminal of the second flying capacitor.

5. The power converter as claimed in claim 4, comprising an inductor coupled to the output terminal.

6. The power converter as claimed in claim 5, wherein the second path and the fourth path comprise the inductor.

7. The power converter as claimed in claim 5, wherein the inductor has a first terminal coupled to the fourth and fifth switches and a second terminal coupled to the sixth and seventh switches.

8. The power converter as claimed in claim 7 comprising a de-magnetization switch to couple the first terminal of the first inductor to ground.

9. The power converter as claimed in claim 5 wherein the inductor has a first terminal coupled to the first flying capacitor via the fourth and sixth switches and to the second flying capacitor via the fifth and seventh switches.

10. The power converter as claimed in claim 3 comprising a first inductor and a second inductor both coupled to the output terminal; wherein the first inductor has a first terminal coupled to the second terminal of the first flying capacitor, and wherein the second inductor has a first terminal coupled to the second terminal of the second flying capacitor.

11. The power converter as claimed in claim 10, wherein in the first state the ground terminal is coupled to the output terminal via an additional path comprising the second inductor; and wherein in the second state the ground terminal is coupled to the output terminal via another additional path comprising the first inductor.

12. The power converter as claimed in claim 10, wherein the fourth and the fifth switches are coupled to the output terminal.

13. The power converter as claimed in claim 10, wherein the first terminal of the first inductor is coupled to the second flying capacitor via the fifth switch and wherein the first terminal of the second inductor is coupled to the first flying capacitor via the fourth switch.

14. The power converter as claimed in claim 1, wherein the sequence comprises an intermediate state, the driver being adapted to select the intermediate state among a plurality of intermediate states based on the target conversion ratio.

15. The power converter as claimed in claim 14 comprising an inductor, wherein the intermediate state is a magnetization state in which one of the input terminal and the ground terminal is coupled to the output terminal via a magnetization path.

16. The power converter as claimed in claim 15, wherein the magnetization path comprises the third flying capacitor and the inductor.

17. The power converter as claimed in claim 14, comprising an inductor, wherein the intermediate state is a de-magnetization state in which the inductor is coupled to ground.

18. The power converter as claimed in claim 17, wherein in the de-magnetization state the driver is adapted to close at least one of the first ground switch and the second ground switch.

19. The power converter as claimed in claim 1, wherein the driver is adapted to maintain the first state and the second state for a predetermined duration during the drive period.

20. The power converter as claimed in claim 19, wherein the driver is adapted to change a duration of the intermediate state based on the target conversion ratio.

21. A method of converting power with a target conversion ratio, the method comprising
providing a ground terminal, an input terminal for receiving an input voltage and an output terminal for providing an output voltage;
providing a first, a second and a third flying capacitor coupled to a network of switches; the network of switches comprising a first switch coupled to the input terminal; a second switch to couple the first flying capacitor to the third flying capacitor; a third switch to couple the second flying capacitor to the third flying capacitor; a first ground switch to couple the first flying capacitor to ground; a second ground switch to couple the second flying capacitor to ground; and a third ground switch to couple the third flying capacitor to ground; and
driving the network of switches with a sequence of states during a drive period, the sequence of states comprising a first state and a second state; wherein in the first state the ground terminal is coupled to the output terminal via a first path and a second path simultaneously, wherein the first path comprises the first flying capacitor coupled in series with the third flying capacitor and bypasses the second capacitor, and wherein the second path comprises the second flying capacitor and bypasses the first capacitor and the third capacitor.

22. The method as claimed in claim 21, wherein in the second state the input terminal is coupled to the output terminal via a third path comprising the second flying capacitor and the third flying capacitor, and wherein the ground terminal is coupled to the output terminal via a fourth path comprising the first flying capacitor.

* * * * *